(12) United States Patent
Maszak et al.

(10) Patent No.: US 7,870,305 B2
(45) Date of Patent: Jan. 11, 2011

(54) PROXY ASSOCIATION FOR DEVICES

(75) Inventors: Mark E. Maszak, Sammamish, WA (US); Randall E. Aull, Kenmore, WA (US); Firdosh K. Bhesania, Kirkland, WA (US); Poovanpilli G. Madhavan, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/684,510

(22) Filed: Mar. 9, 2007

(65) Prior Publication Data

US 2008/0222315 A1 Sep. 11, 2008

(51) Int. Cl.
G06F 3/00 (2006.01)
G06F 15/177 (2006.01)
G06F 15/173 (2006.01)
G06F 15/16 (2006.01)
H04L 12/28 (2006.01)
H04L 12/56 (2006.01)

(52) U.S. Cl. .............. 710/17; 710/8; 710/18; 709/220; 709/225; 709/228; 370/395.21

(58) Field of Classification Search ......... 710/8, 710/17, 18; 709/220, 225, 228; 370/395.21
See application file for complete search history.

(56) References Cited

U.S. PATENT DOCUMENTS

| | | | |
|---|---|---|---|
| 6,665,756 B2 | 12/2003 | Abramson et al. | |
| 6,708,228 B1 | 3/2004 | Meyers et al. | |
| 7,051,128 B2 | 5/2006 | Bando | |
| 7,114,012 B2 | 9/2006 | Morishita et al. | |
| 7,251,238 B2 * | 7/2007 | Joshi et al. | 370/338 |
| 7,373,644 B2 * | 5/2008 | Aborn | 718/105 |
| 2005/0108369 A1 | 5/2005 | Sather et al. | |
| 2006/0026270 A1 | 2/2006 | Sadovsky et al. | |
| 2006/0085639 A1 | 4/2006 | Phillips et al. | |
| 2006/0098612 A1 * | 5/2006 | Joshi et al. | 370/338 |
| 2006/0168351 A1 | 7/2006 | Ng et al. | |
| 2007/0106670 A1 * | 5/2007 | Yoakum et al. | 707/10 |

FOREIGN PATENT DOCUMENTS

WO  WO 2006/107747 A1  10/2006

OTHER PUBLICATIONS

Gary Legg "USB Goes Wireless", TechOnline, Oct. 21, 2004, retrieved from the Internet http://www.commsdesign.com/showArticle.jhtml?articleID=192200285 on Oct. 30, 2006

(Continued)

*Primary Examiner*—Alford W Kindred
*Assistant Examiner*—Farley J Abad
(74) *Attorney, Agent, or Firm*—Capitol City TechLaw; Richard C. Irving

(57) ABSTRACT

A first connection is established between a first device and a host, wherein the first device is host-capable. A second connection is established between a second device and the host. Proxy association is performed between the first device and the second device by the host to associate the first and second devices, wherein the first and second devices are unable to directly associate, wherein the host passes association information between the first and second devices.

18 Claims, 12 Drawing Sheets

OTHER PUBLICATIONS

Intel "Wireless USB. The First High-speed Personal Wireless Interconnect", White Paper, Copyright © 2005, Intel Corporation.

Microsoft Corporation "Windows Rally Technologies: An Overview", May 23, 2006.

Microsoft Corporation "A Windows® Rally™ Specification. Windows Connect Now-NET", Sep. 15, 2006, Version 1.0.

Wi-Fi Alliance "Wi-Fi Alliance® Announces Wi-Fi Protected Setup™", Aug. 16, 2006.

"Wireless Universal Serial Bus Specification"; Agere, Hewlett-Packard, Intel, Microsoft, NEC, Philips, Samsung; May 12, 2005, Revision 1.0.

"Association Models Supplement to the Certified Wireless Universal Serial Bus Specification", Mar. 2, 2006, Revision 1.0.

* cited by examiner

PROXY ASSOCIATION FOR DEVICES

BACKGROUND

When a device is connected to a host system, the host system saves some state information for each device. The state information may include speed of the device or the port number of the port the device was connected to on the host. The state information may also include association information. This association information is generated after going through a process where the user validates that a specific device should be allowed to communicate with their specific host system. This association process is done in different ways for each connectivity technology and is often referred to as bonding or associating a device with a host.

Usually, the association between a host and a device is performed once when the host and the device are first connected. Thereafter, the device may repeatedly connect and disconnect to the host without repeating the association process. The device and the host may connect using stored association information.

Current device/host association models have various shortcomings. Current association technologies often require a user to manually associate each device with each host. Also, when a user acquires a new host machine, the user has to tediously associate all of their devices with the new host machine.

In another instance, the association technology used by a device is not supported by a portable device host (e.g., a media player), but is supported by a Personal Computer (PC) host. In this case, the device may only be associated with the PC host and not the portable device host. A manufacturer of a device or a host may not wish to include a specific association technology because of costs. These costs may be related to the actual cost of additional hardware (e.g., processors capable of performing certain forms of encryption for association) or they may be related to design costs (e.g., implementing a USB port or a LCD display on a device).

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Embodiments of the invention provide proxy association for devices. In one embodiment, a host may impersonate a device in order to associate the impersonated device with another host-capable device. In another embodiment, a device having associations with multiple hosts may use a method to rank multiple hosts to determine which host to connect when two or more hosts are available to the device.

Many of the attendant features will be more readily appreciated as the same become better understood by reference to the following detailed description considered in connection with the accompanying drawings.

BRIEF DESCRIPTION OF THE DRAWINGS

Like reference numerals are used to designate like parts in the accompanying drawings.

DETAILED DESCRIPTION

The detailed description provided below in connection with the appended drawings is intended as a description of the present examples and is not intended to represent the only forms in which the present examples may be constructed or utilized. The description sets forth the functions of the examples and the sequence of steps for constructing and operating the examples. However, the same or equivalent functions and sequences may be accomplished by different examples.

In the following description and claims, the term "coupled" and its derivatives may be used. "Coupled" may mean that two or more elements are in contact (physically, electrically, magnetically, optically, etc.). "Coupled" may also mean two or more elements are not in contact with each other, but still cooperate or interact with each other (for example, communicatively coupled).

Figure 1:
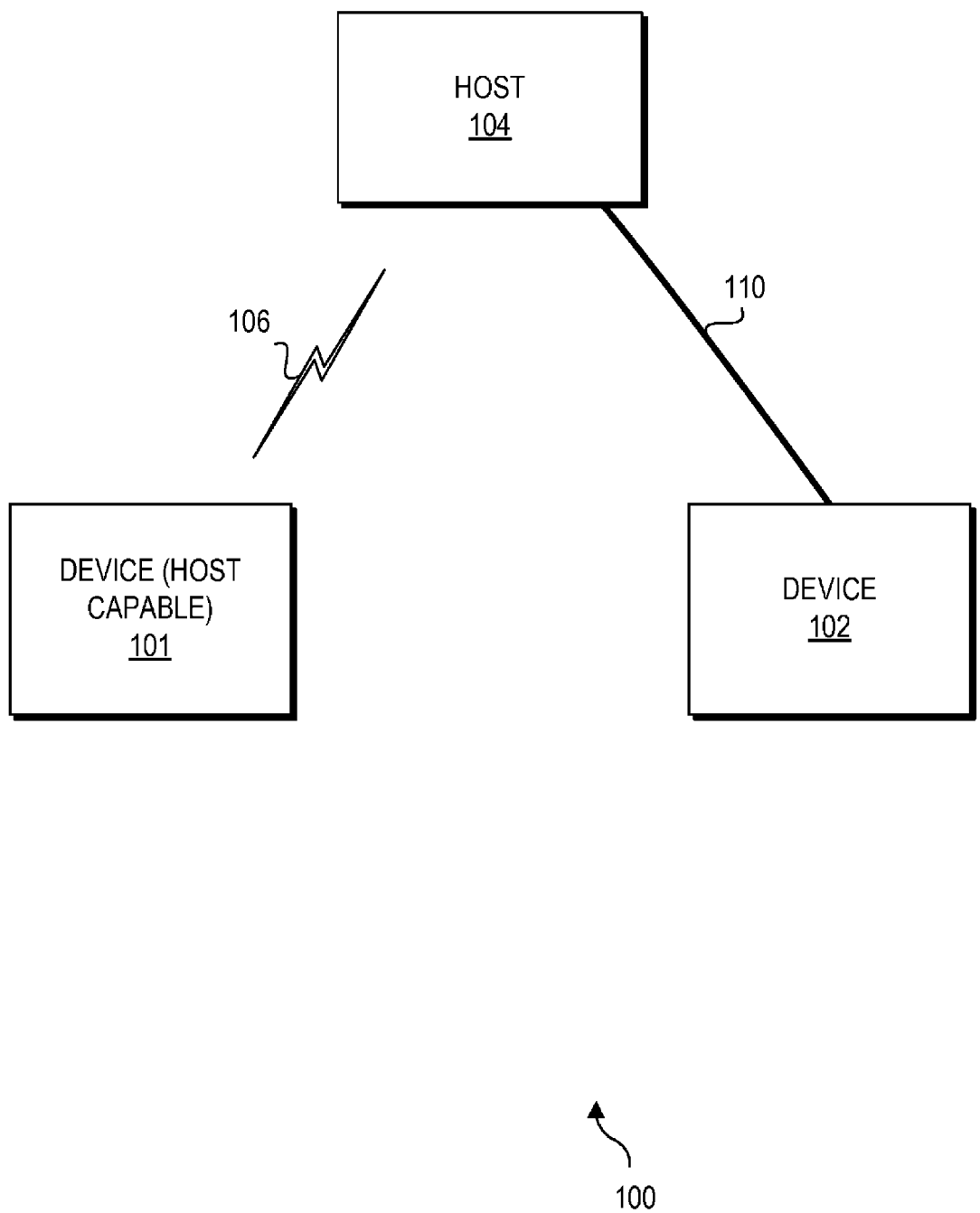
FIG. 1 is a block diagram of an example computing environment for implementing embodiments of the invention.

FIG. 1 and the following discussion are intended to provide a brief, general description of a suitable computing environment to implement embodiments of the invention. The operating environment of FIG. 1 is only one example of a suitable operating environment and is not intended to suggest any limitation as to the scope of use or functionality of the operating environment. Although not required, embodiments of the invention will be described in the general context of "computer readable instructions" being executed by one or more computing devices. Computer readable instructions may be distributed via computer readable media. Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 1 shows an environment 100 including a device 101, a device 102, and a host 104. Device 101 supports one type of association model and device 102 supports another type of association model. Host 104 supports both association models used by devices 101 and 102. Since devices 101 and 102 use different association models, device 101 and device 102 cannot be directly associated with each other. The association models used by device 101 and device 102 are incompatible for direct association. Embodiments herein enable host 104 to act as a proxy to enable device 101 and device 102 to associate and subsequently connect. In FIG. 1, device 101 is a host capable device that may operate as a device or operate as a host when in host mode. Device 101, device 102, and host 104 may include any type of computing device, such as a personal computer or an embedded device. Embodiments of a computing device are discussed below in conjunction with FIG. 12.

While the embodiment of environment 100 shows a wireless connection 106 and a wired connection 110, it will be understood that embodiments of the invention may be used with any combination of wired/wireless connections or any other communication media between devices and hosts.

Figure 2:
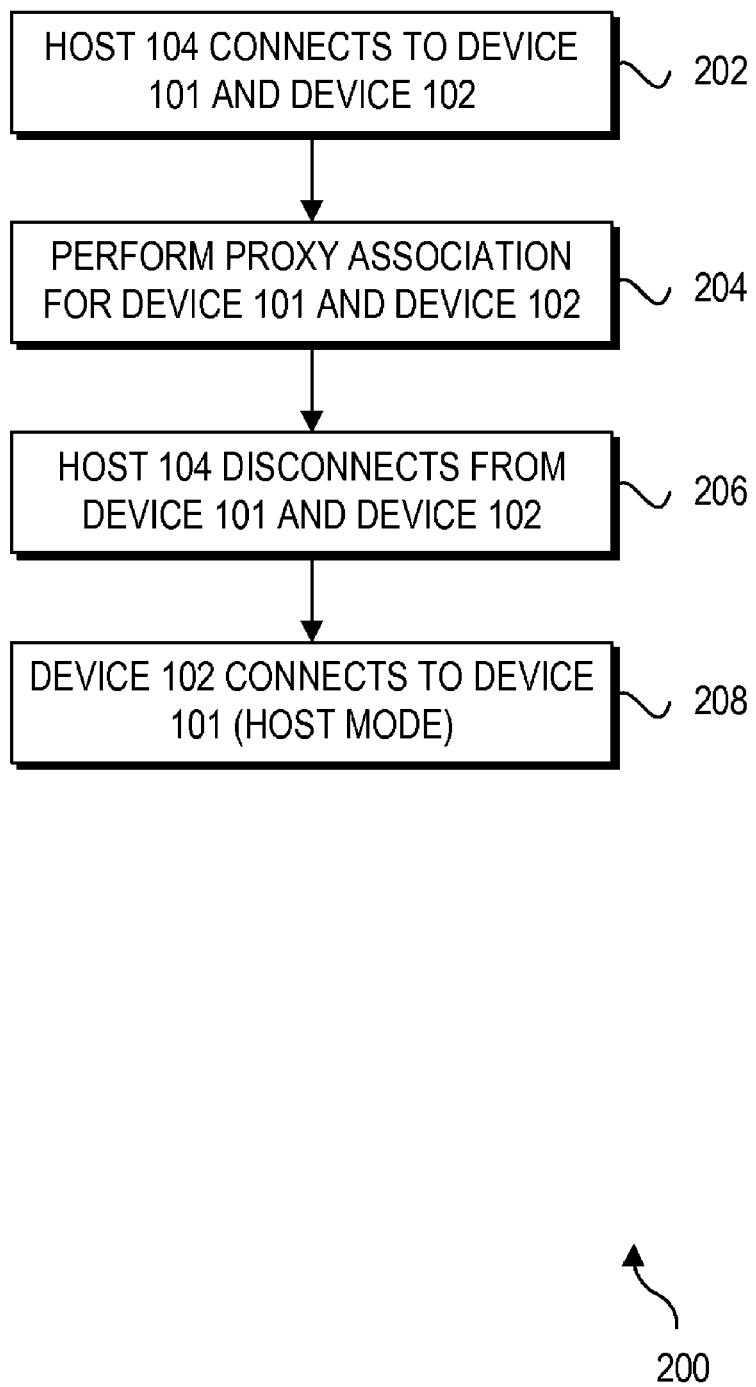
FIG. 2 is a flowchart showing the logic and operations of proxy association in accordance with an embodiment of the invention.

Turning to FIG. 2, a flowchart 200 shows the logic and operations of proxy association in accordance with an embodiment of the invention. Starting in block 202, host 104 connects to devices 101 and 102. In one embodiment, device 101 and device 102 are each associated with host 104. In another embodiment, host 104 passes association-related information between devices 101 and 102, but host 104 itself does not become associated with device 101 or device 102.

Next, in block 204, proxy association is performed for devices 101 and 102. Host 104 passes association information between device 101 and device 102. In block 206, host 104 disconnects from devices 101 and 102. Continuing to block 208, device 102 connects to device 101 (now in host mode).

Figure 3:
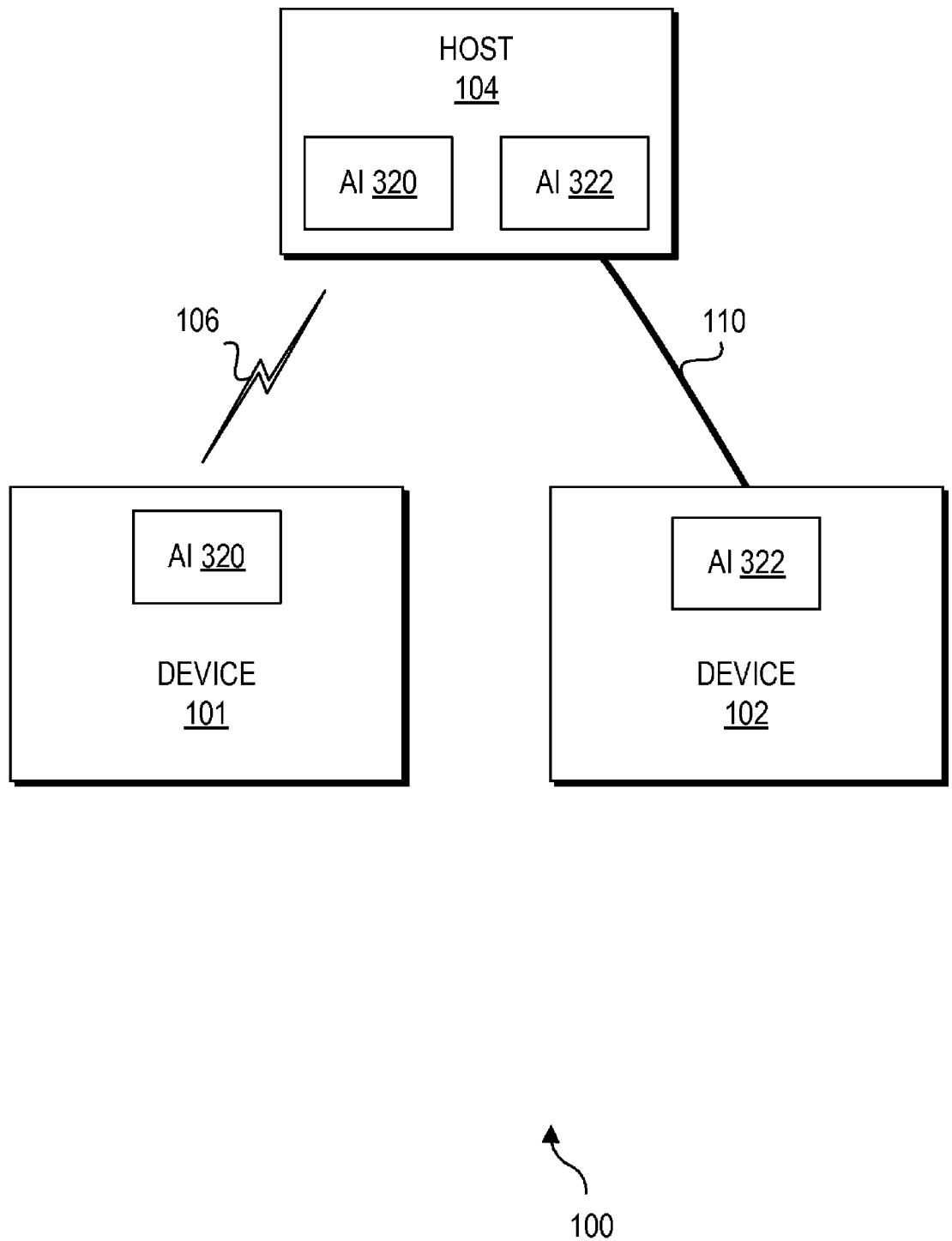
FIG. 3 is a block diagram of an example computing environment for implementing embodiments of the invention.

Turning to FIGS. 3-6, embodiments of proxy association where host 104 is associated with devices 101 and 102 will be discussed. In FIG. 3, device 101 has stored association information (AI) 320 for connecting to host 104 and host 104 has a corresponding copy of association information 320. Device 102 has stored association information 322 for connecting to host 104 and host 104 has stored a corresponding copy of association information 322. In FIG. 3, device 101 has been associated with host 104 and device 102 has been associated with host 104.

An association process includes passing association information between the host and the device. In one embodiment, the association information includes a host identification and a device identification. In one example, the device identification may be assigned by the host, and is not necessarily unique to the device. In one embodiment, the association information may include a secret that is only known by the host and the device. The secret may include a key, a certificate, or other security measure. This secret enables the host and the device to authenticate the identity of the other when reconnecting after the association process. The use of this secret prevents the spoofing of the host or the device during a subsequent connection.

Normally, the association between a host and a device is a one-time process that is only necessary the first time a device is used with a host. The association may require affirmation from the user. This affirmation may take the form of making a physical connection (e.g., connecting a USB cable between device and host), requiring the user to enter a key code on the host and/or device, requiring the user to confirm numbers displayed on the host and the device match, and the like. On subsequent connections, the device and the host automatically connect using their stored association information from the association process.

Embodiments of the invention are described in the context of a Wireless Universal Serial Bus (USB) (Wireless USB Specification, Rev. 1.0, May 12, 2005) implementation. However, one skilled in the art having the benefit of this description will appreciate that embodiments of the invention may be applied to other connection technologies having various association models. These other connection technologies include, but are not limited to, Bluetooth®, Wireless Fidelity (Wi-Fi) (e.g., IEEE 802.1-based standards), wireless IEEE 1394, and the like. Embodiments herein may be used with any wired or wireless technology that uses an association between two entities (e.g., a host and a device).

In one embodiment, host 104 supports a cable association model and a numeric association model as used with Wireless USB devices. Device 101, which is also host-capable, supports only numeric association. Numeric association is used with a Wireless USB connection, such as wireless connection 106. Device 102 supports only cable association. Cable association is used with USB cable connection 110.

Cable association uses a USB cable to perform the association between a device and a host. The device is connected to the host with a USB cable for the first-time association. After the association is completed, the device and the host may be connected via the USB cable or use a wireless connection. In FIG. 3, device 102 is capable of Wireless USB communication (i.e., has a wireless interface such as a radio transmitter/receiver). However, the numeric association method is not supported by device 102.

In a Wireless USB implementation, association information includes a connection context (CC). The CC includes a connection host identification (CHID) and a connection device identification (CDID). In a Wireless USB connection, the CC also includes a connection key (CK) for authentication of devices and hosts (discussed below). The CC is derived at the host and the device so that a connection may be established between the device and the host in the future without the association process. Wireless USB devices that use a wired USB cable for association receive a full CC which includes a CK. The CK is sent from the host to the device after the cable association is complete.

In FIG. 3, device 102 supports cable association. In cable association, the host is notified of the device's presence when the cable is plugged into the host (i.e., a physical electrical connection is made). In one embodiment, the act of plugging in the cable is considered implicit user authorization for association. In another embodiment, the user is prompted to confirm the association before the association is allowed to complete (i.e, explicit confirmation). Once association is authorized, the host sends the CC to the device and keeps a copy of the CC for itself. The device stores the CC. At this time, the association is complete.

In FIG. 3, device 101 supports numeric association used with Wireless USB. Wireless USB proscribes measures to prevent attackers from eavesdropping on the CC exchange or inserting themselves as imposters in the CC exchange (e.g., man-in-the-middle attack). The host stores a copy of the CC. The device also stores a copy of the CC, so the device and the host may re-connect in the future without going through the association process. The CC may be used for authentication of host and device.

In current Wireless USB, the Diffie-Hellman protocol is used to establish a secure channel between the host and the device for exchanging the CC. In one embodiment, during the association process, the host and the device each compute a value that is derived from the Diffie-Hellman keys. The values are displayed on the host and on the device. The user is then asked to verify that the values match to complete the association. If the user indicates that the values do not match, then association has failed and the devices are not allowed to connect.

If the user indicates the values match, the host and the device each compute a connection key (CK). The CK is used for authentication of the device and host when re-connecting in the future. The CK allows the host and device to prove to each other that they know a common secret. The CK is unique per device; the host does not give the same key to more than one device. The host may also send any other association information to the device (e.g., host identification, device identification, friendly name, etc.). The device constructs the CC and stores the CC for later use. The host also maintains its own copy of the CC. At this point, the association is complete. After completion of the association, the device is presented to the host Wireless USB stack to begin normal Wireless USB connectivity.

Figure 4:
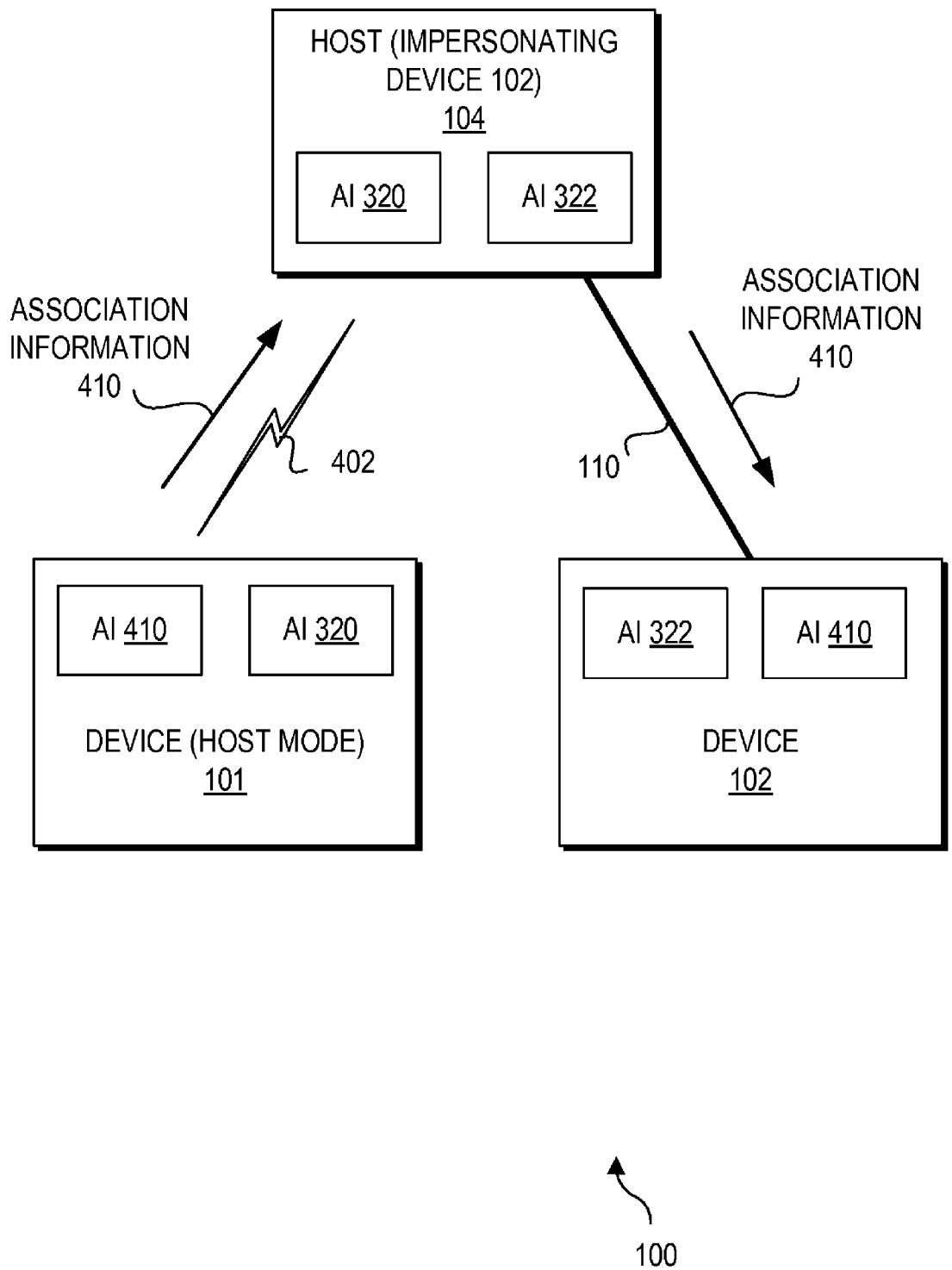
FIG. 4 is a block diagram of an example computing environment for implementing embodiments of the invention.

Turning to FIG. 4, an embodiment of proxy association is shown. Device 101 has been put into host mode. Host 104 impersonates device 102 and requests a host connection from device 101. Device 101 responds to host 104 (that is impersonating device 102) accordingly. Since host 104 has a cable connection 110 with device 102, host 104 may gather the requisite information to pretend to be device 102.

Host 104 (impersonating device 102) and device 101 (acting as a host) perform an association process using wireless connection 402. It is noted that wireless connection 402 may be a distinct connection from wireless connection 106 in FIG. 3 because wireless connection 106 is between host 104 and device 101 while wireless connection 402 is between device 101 (acting as host) and host 104 impersonating device 102. Host 104 impersonates device 102 as needed to accomplish the proxy association, but host 104 does not necessarily emulate any other functionality of device 102.

Device 101 passes association information 410 to host 104 to establish a new connection with host 104. Host 104 in turn sends association information 410 to device 102 using connection 110. Now device 102 has association information 410 needed for connecting to device 101. It is noted that in Wireless USB, host 104 will compute the CK and receive the CHID from device 101 to complete the CC for the association.

Figure 5:
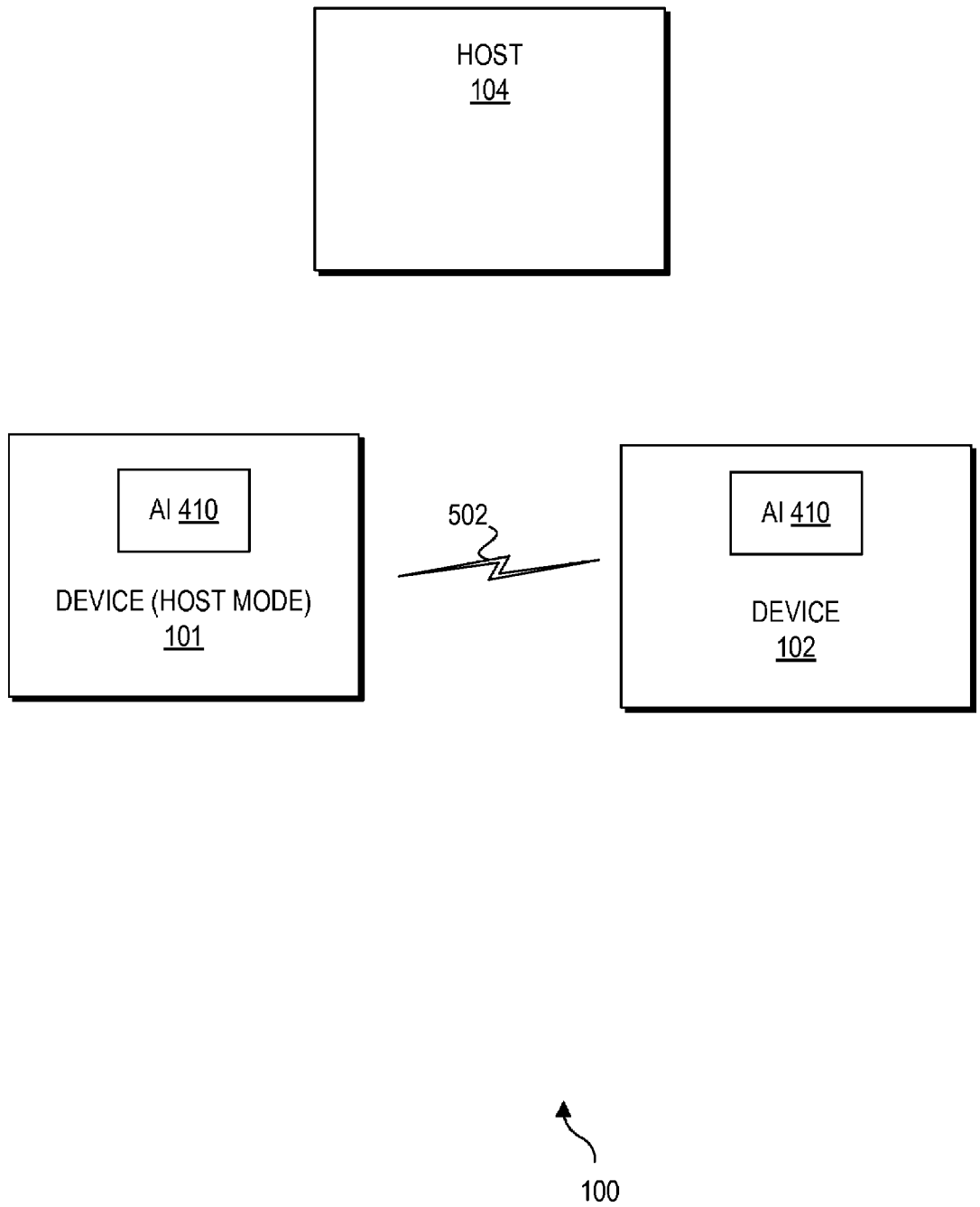
FIG. 5 is a block diagram of an example computing environment for implementing embodiments of the invention.

Turning to FIG. 5, device 101 may act as a host for device 102. Device 102 may establish wireless connection 502 to device 101 using association information 410. In the embodiment of FIG. 5, host 104 is no longer connected to device 101 or device 102. Host 104 is not needed for devices 101 and 102 to connect since device 102 has association information 410. Device 101 may still have stored AI 320 and device 102 may still have stored AI 322, but they are not shown in FIG. 5 for clarity. AI 320 and AI 322 may be removed from host 104 to provide a "pure" proxy association (discussed below).

In one scenario, proxy association may be used to associate a device with numerous hosts without performing the association directly between the device and each host. A user may want to only associate a device once with a host even though the user has several hosts. For example, the user buys a new handheld media player and wants to associate the media player with all of the user's PCs (i.e., hosts). The user may use proxy association to associate the device with all of the user's hosts.

For example, referring to FIGS. 3-5, host 104 includes the old host, device 101 includes the new host, and device 102 includes the user's device. The old host may impersonate device 102 to create an association with the new host. The old host would then pass the association information to device 102. Thus, the new host and the device may now connect directly the first time without going through an association process. This process may be repeated numerous times so that all the hosts a user owns may be associated with a particular device without the user having to endure a direct association between each host and the device. This exchange may be through any secure channel, including a network connection. It does not need to be an in-band Wireless USB connection with each host.

In one embodiment, the association information may be removed from the old host so that the device may no longer connect to the old host (unless the device is re-associated with the old host). In another embodiment, the association information may remain on the old host for connecting the old host to the device. Embodiments of determining which host a device connects to in a multiple associated host environment are discussed below.

In another scenario, multiple connection technologies may be associated in a single proxy association session. This proxy association of multiple connection technologies may be transparent to the user. For example, suppose devices 101 and 102 support WiFi, Wireless USB, and Bluetooth®. In one embodiment, the proxy association is conducted once using global identifiers for the host and the device and a global shared key for a particular connection technology (e.g., Wireless USB). Once the association is completed, then other connection technologies on devices 101 and 102 may use the global identifiers and global key for generating their particular association information. In another embodiment, the proxy association may be performed for each connection technology during one proxy association session. In this embodiment, the multiple proxy associations may be conducted sequentially, simultaneously, or any combination thereof. For example, a proxy association may be conducted three times; once for Wireless USB, once for WiFi, and once for Bluetooth® during a single proxy association session.

Embodiments of the invention may also be used in a "pure" proxy association scenario. In this case, once the proxy association is completed, the association information is removed from the host (e.g., host 104) used for proxy association so the host (e.g., host 104) may no longer connect to the devices (unless the association process is repeated). Referring to FIG. 4, association information 320 and 322 may be deleted from host 104. Also, any copies of association information 410 that passed through host 104 may be deleted from host 104. For example, a user may purchase a new device at an airport store. However, the new device and the user's host-capable device cannot be associated directly. A public computer, such as at an airport kiosk, may be associated with both the user's host-capable device and the user's new device. The public computer may perform the proxy association so that the user's newly purchased device and current host-capable device may be associated and thus connect. After the proxy association, the association information related to the user's host capable device and new device may then be removed from the public computer.

Figure 6:
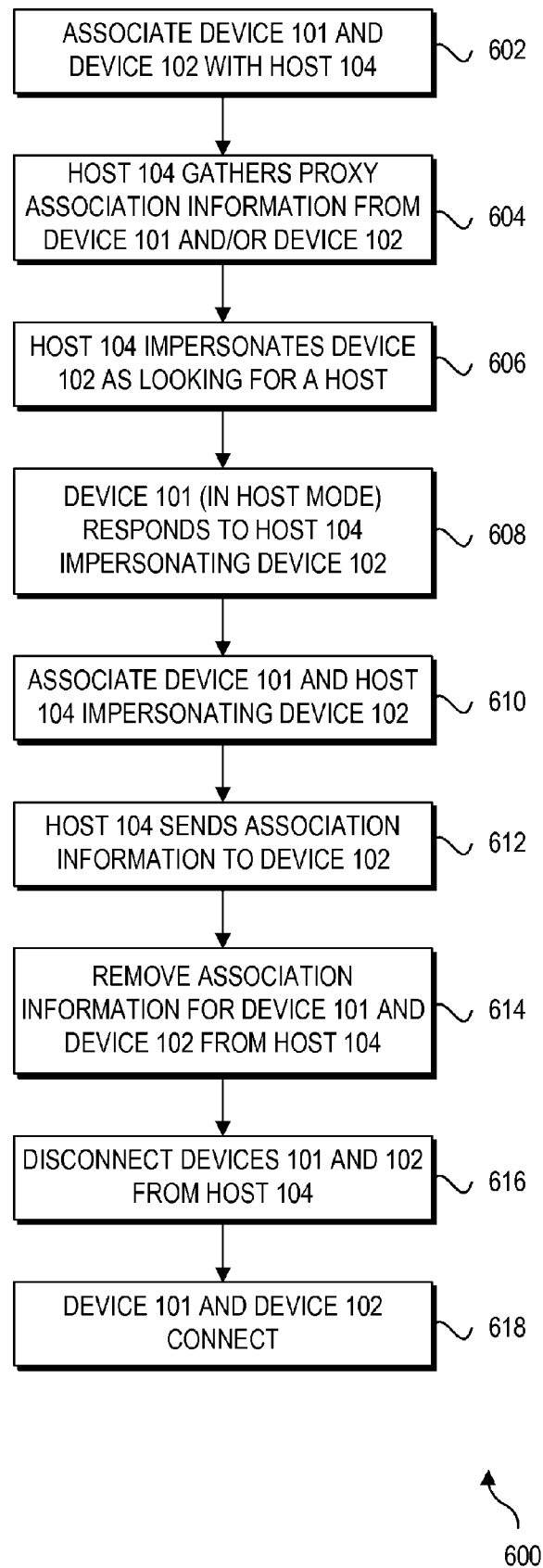
FIG. 6 is a flowchart showing the logic and operations of proxy association in accordance with an embodiment of the invention.

Turning to FIG. 6, a flowchart 600 shows the logic and operations of proxy association in accordance with one embodiment of the invention. The discussion of flowchart 600 is made in reference to FIGS. 3-5, but it will be understood that embodiments of the invention are not limited to environment 100 of FIGS. 3-5. In one embodiment, at least a portion of the logic of flowchart 600 is performed by host 104.

Starting in block 602, device 101 and device 102 are associated with host 104. This association may have occurred previously when a user first obtained device 101 or device 102. The association of devices 101 and 102 with host 104 did not necessarily occur at the same time.

Proceeding to block 604, the host gathers proxy association related information from device 101 and/or device 102. In one embodiment, host 104 gathers information from device 102 needed for impersonating device 102. It will be noted that some or all of this information may have already been obtained by host 104 when device 102 was first associated with host 104 (for example, the CDID of device 102 in the case of association for USB devices).

In one embodiment, host 104 queries the devices as to whether the devices have the ability to perform proxy association. In one embodiment, the ability to perform proxy association would include the ability for device 102 to receive the association information 410 from another computing device that is not the host (i.e., device 101). In one embodiment, association information 410 may be sent to device 102 from host 104 using current protocols.

In another embodiment, association information 410 may be sent to device 102 from host 104 using a proxy association protocol. In this case, device 102 would be complicit in using the proxy association protocol.

Continuing to block 606, host 104 impersonates device 102. Host 104 behaves as device 102 does when looking for a host to connect to. In a USB implementation, host 104 (impersonating device 102) sends out a new connection request.

Proceeding to block 608, device 101 (operating in host mode) responds to host 104 which is impersonating device 102. Device 101 responds as if device 101 is receiving a connection request from a new device.

Continuing to block 610, host 104 impersonating device 102 is associated with device 101 operating in host mode. As part of the association process, host 104 receives association information. In a USB implementation, host 104 receives the CHID for device 101 operating as a host and the means to compute the connection key (CK). It will be noted that in the exchange of block 610, the CC includes the CDID for device 102 and not a CDID for host 104.

Continuing to block 612, host 104 sends association information 410 to device 102. In one embodiment, association information 410 is sent via conventional communication protocols for the connection between host 104 and device 102. In another embodiment, association information 410 is sent via a proxy association protocol.

Continuing to block 614, the association information for device 101 and device 102 are removed from host 104 to provide a pure proxy association. In FIG. 5, association information 320 and 322 may be deleted from host 104. Also, any copies of association information 410 that passed through host 104 may also be removed from host 104.

Proceeding to block 616, device 102 is disconnected from host 104.

Next, in block 618, device 101 and device 102 are connected. Device 102 may connect to device 101, where device 101 acts as the host, using association information 410. Even though device 101 and device 102 may be connecting for the first time, the association process does not have to be performed because device 102 already has association information 410.

Figure 7:
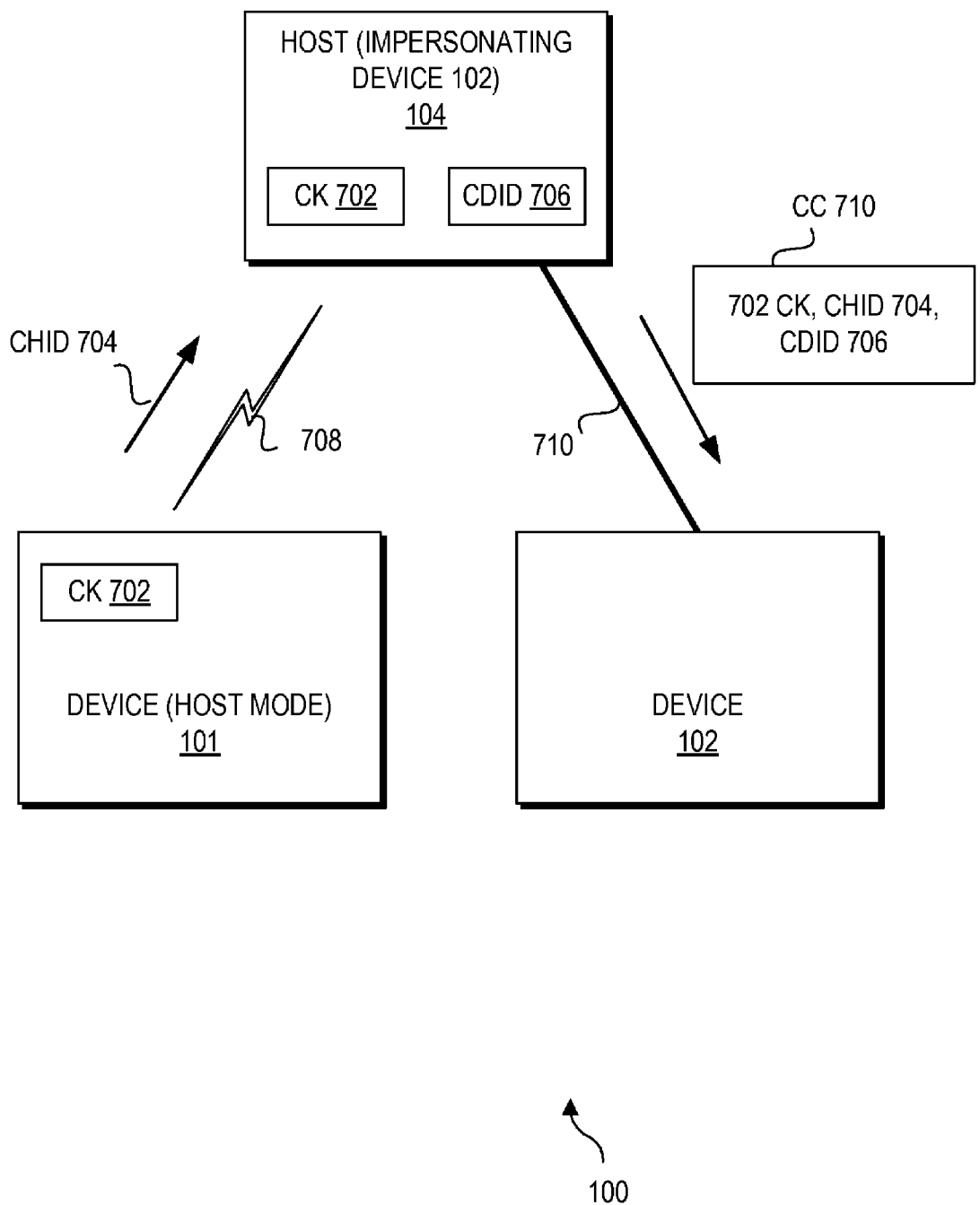
FIG. 7 is a block diagram of an example computing environment for implementing embodiments of the invention.
Figure 8:
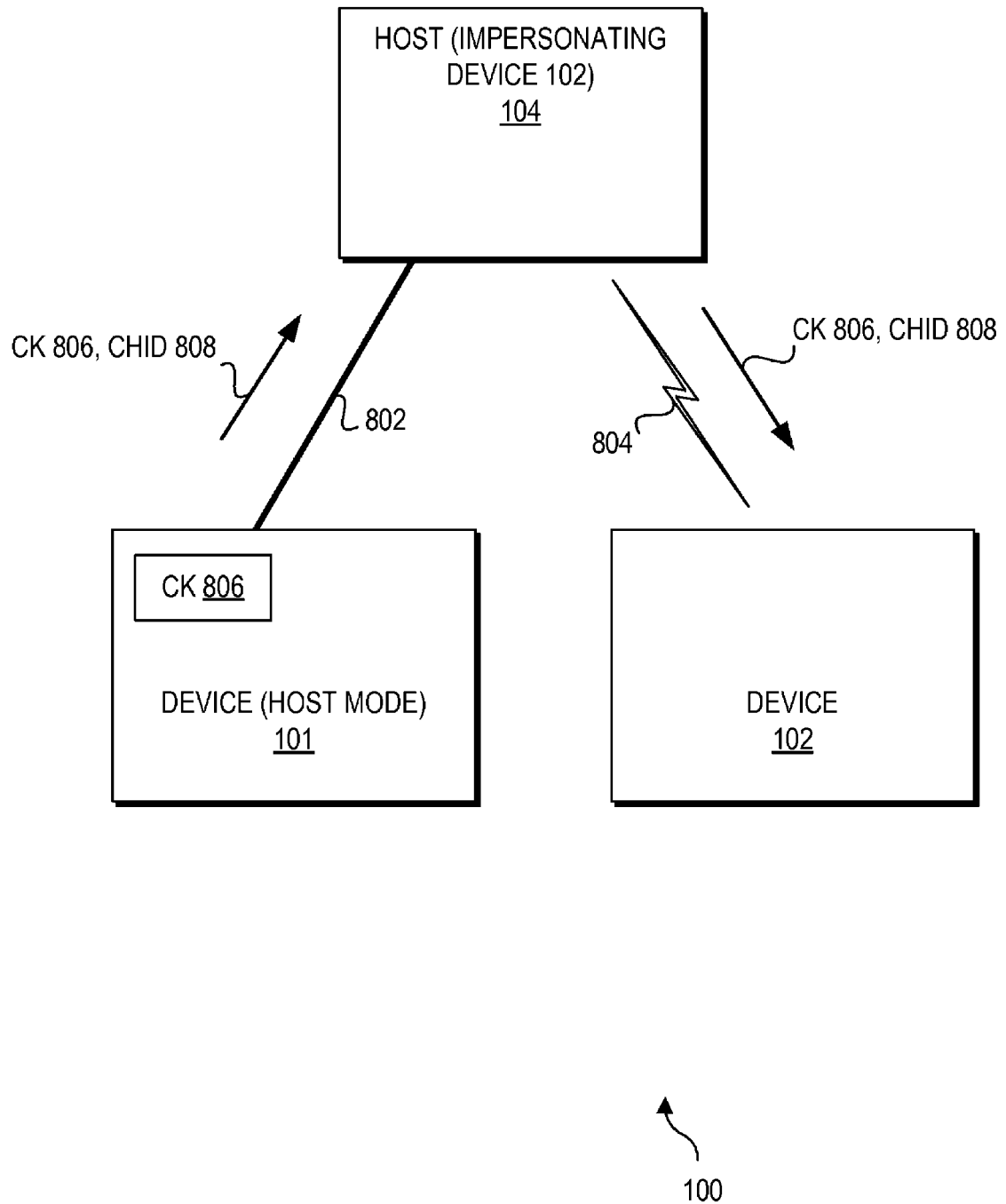
FIG. 8 is a block diagram of an example computing environment for implementing embodiments of the invention.
Figure 9:
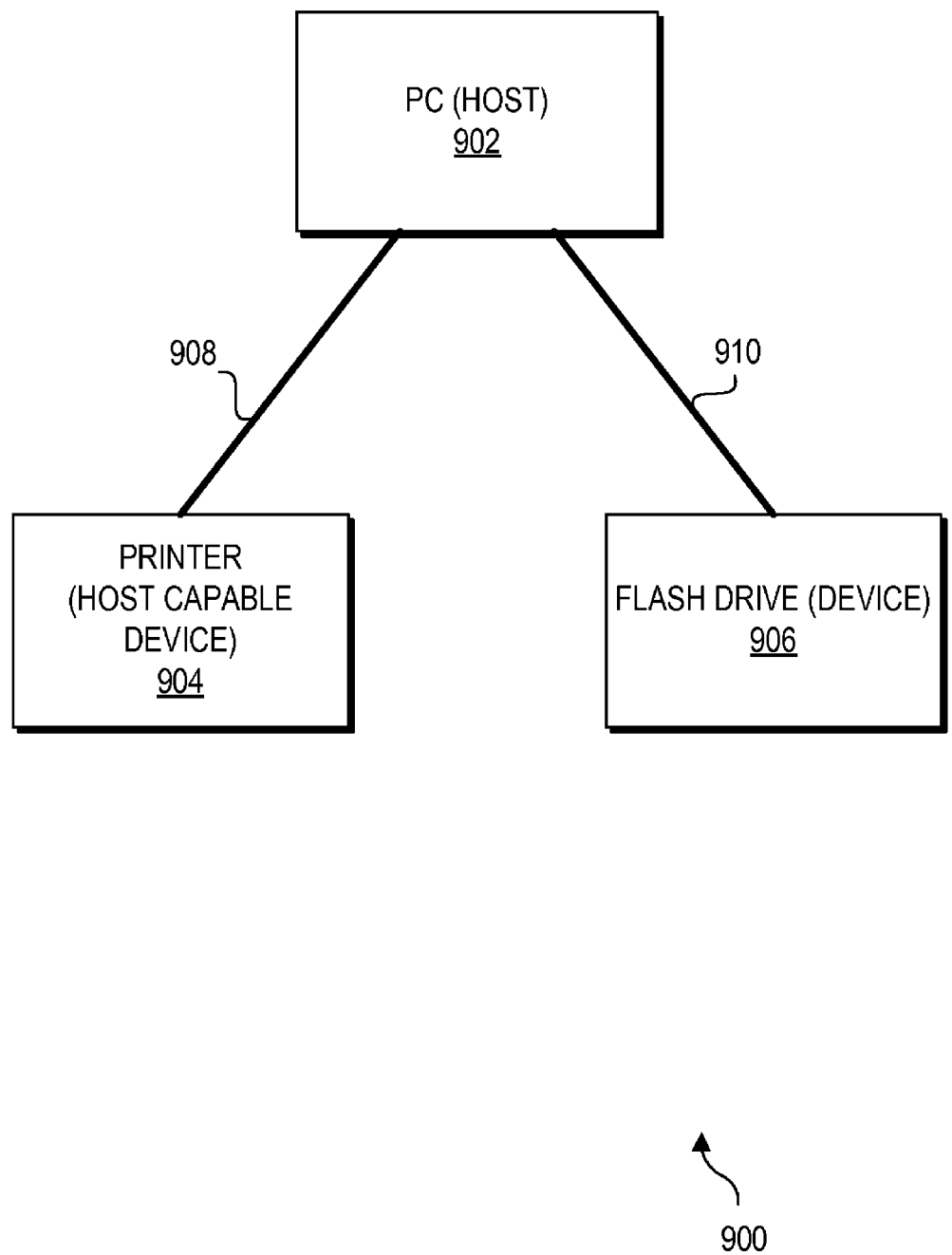
FIG. 9 is a block diagram of an example computing environment for implementing embodiments of the invention.

Referring to FIGS. 7-9, embodiments of proxy association may be conducted without associating host 104 with each device 101 and 102. Host 104 may connect to devices 101 and 102 for passing association-related information between devices 101 and 102, but host 104 is not associated with device 110 or device 102. Host 104 does not store association information in a manner to establish an association with device 101 or device 102. In one embodiment, portions of the Wireless USB protocol may be extended to support proxy association without associating host 104 with device 101 and/or 102. One skilled in the art having the benefit of this description will appreciate how flowchart 600 may be modified for use with the embodiments of FIGS. 7-9. In one embodiment, blocks 602 and 614 of flowchart 600 are unneeded since host 104 is not associated with device 101 or device 102.

For example, in FIG. 7, host 104 connects to device 101 (in host mode) using Wireless USB connection 708 and connects to device 102 using wired USB connection 710. Host 104 obtains CDID 706 from device 102. If device 102 does not have a CDID, then host 104 generates CDID 706 for device 102. Host 104 may respond to device 101 (in host mode) as device 102 using CDID 706 of device 102 (either retrieved or generated). Host 104 (impersonating device 102) derives a CK 702 as part of the connection process with device 101. Host 104 also receives device 101's host ID (CHID 704). Then, host 104 constructs a CC 710 using CK 702, CHID 704, and CDID 706. Host 104 then sends CC 710 to device 102. The transport of CC 710 to device 102 is considered secure since connection 710 is wired. Device 102 and device 101 (host mode) are now associated so when device 102 wirelessly connects to device 101 (in host mode), device 102 has CC 710 for connecting to device 101. It is noted that host 104 did not retain any CC for wireless connection 708 to device 101.

In FIG. 8, host 104 connects to device 101 (in host mode) using wired USB connection 802 and connects to device 102 using Wireless USB connection 804. Host 104 and device 102 each derive a CK for a secure Wireless USB connection 804 as part of the connection process. Host 104 impersonates device 102 when connecting to device 101. Host 104 receives CK 806 and CHID 808 across wired connection 802 from device 101. Host 104 passes CK 806 and CHID 808 to device 102 across secure Wireless USB connection 804. Host 104 instructs device 102 to update its CC for Wireless USB connection 804 with CK 806 and CHID 808. Then, when device 102 wirelessly connects to device 101 (in host mode), device 102 has correct information for the CC for connecting to device 101 (i.e., CHID 808 for device 101 and CK 806).

Turning to FIG. 9, environment 900 shows an embodiment of proxy association to associate two devices that have compatible association models, but cannot directly associate. In FIG. 9, printer 904 (a host-capable device) and mobile flash drive 906 (a device) each support cable association for wired USB. However, printer 904 has a USB mini-B port and flash drive 906 has a USB A port. These USB ports are physically incompatible. One skilled in the art having the benefit of this description will appreciate that embodiments of FIG. 9 are not limited to use with PC 902, printer 904 and flash drive 906, but these are just example devices/hosts for discussion.

In FIG. 9, printer 904 (a host-capable device) and mobile flash drive 906 (a device) each support cable association for wired USB. PC 902 connects to printer 904 using wired USB connection 908. PC 902 connects to flash drive 906 using wired USB connection 910. PC 902 may proxy an association between printer 904 (host mode) and flash drive 906 (device). Printer 904 and flash drive 906 may now directly connect via PC 902 without PC 902 hosting printer 904 or flash drive 906. In one example, the embodiment of FIG. 9 enables a user to print pictures stored on flash drive 906 through a connection with printer 904.

Figure 10:
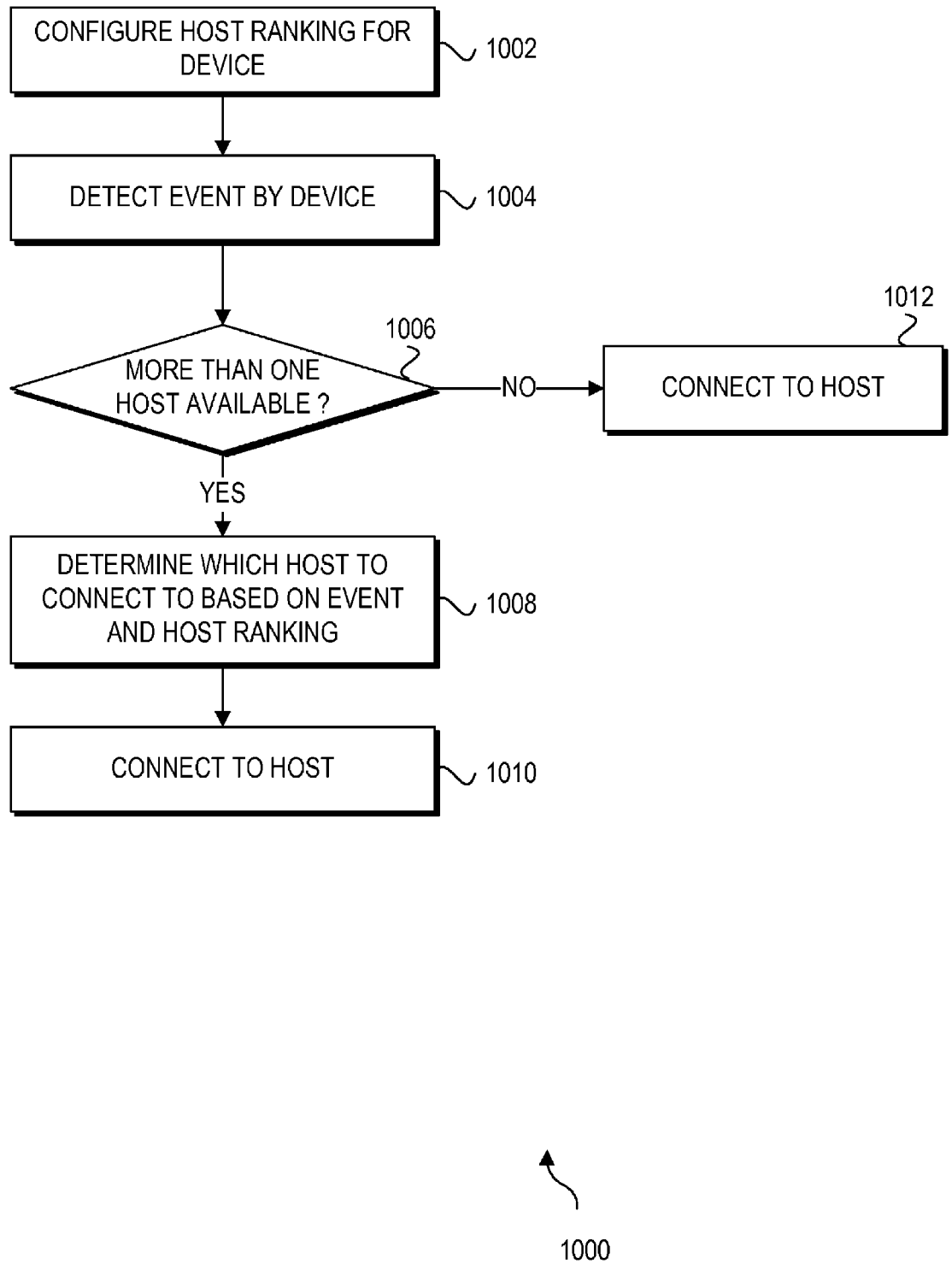
FIG. 10 is a flowchart showing the logic and operations conducted by a device when determining which host to connect to in a multiple host environment in accordance with an embodiment of the invention.

Turning to FIG. 10, a flowchart 1000 shows the logic and operation of host ranking in accordance with an embodiment of the invention. In one embodiment, at least a portion of the logic of flowchart 1000 is performed by a device, such as device 102.

In some instances, a device may be associated with more than one host. When more than one host is available to the device at a particular time, the device may determine which host has priority. Alternatively, in some connection technologies, the device may be able to connect to more than one host at a time, but the number of host connections may be limited so managing lists of hosts through host ranking may be needed. For example, the device may work its way through the connection rules until all available host connections have been exhausted.

In another case, assume a device may only be associated with 2 hosts at a time, but the user wants to associate the device with a $3^{rd}$ host. In one embodiment, the user is provided with information on the device and allowed to make a decision as to which association is deleted. In another embodiment, host ranking management code on the device automatically decides which association to delete. For example, the oldest association is deleted. In another example, the device examines its stored host ID's (e.g., CHID's) and determines if an association with any host was proxied as described herein. If an association was via proxy, then the user will probably want to use the host again, so the device does not delete that association (if more than 2 hosts still remain, then other logic (such as described above) may be used to reduce the number of hosts as needed).

Starting in block 1002, host ranking is configured for the device. In one embodiment, a user is presented with a user interface (UI) for manipulating the host rankings and related settings. In one embodiment, the device may have its own display and input device(s) for configuring the host rankings. In another embodiment, the device may be connected to a host, such as a PC, and the PC provides a UI for manipulating the host rankings on the device. In yet another embodiment, the host ranking may be generated on host 104 during proxy association and sent to device 102 during the proxy association process.

Continuing to block 1004, an event is detected by the device. An event may include a change of state at the device or a change in the environment the device is operating in. For example, when a device is switched on, this causes the device to look for a host to connect to in the area. This connection may be wired or wireless. In another example, an event may include activation of an input device, such as a button, on the device. In yet another embodiment, an event may include a host becoming available to the device. The host may become available because the host was turned on or the device/host was moved and became within wireless range of each other.

Proceeding to decision block 1006, the logic determines if more than one host is available to the device. If the answer is no, then the logic proceeds to block 1012 to connect to the available host. In one embodiment, the device may connect to the host using stored association information from a proxy association as described above.

If the answer to decision block 1006 is yes, then the logic continues to block 1008. In block 1008, the logic determines which host the device is to connect to based at least in part on the event and the host rankings at the device. The host rankings provide a ranking order of available hosts the device is to connect to. Example host ranking connection rules are discussed below in conjunction with FIG. 11.

Proceeding to block 1010, the device connects to the host determined in block 1008.

Figure 11:
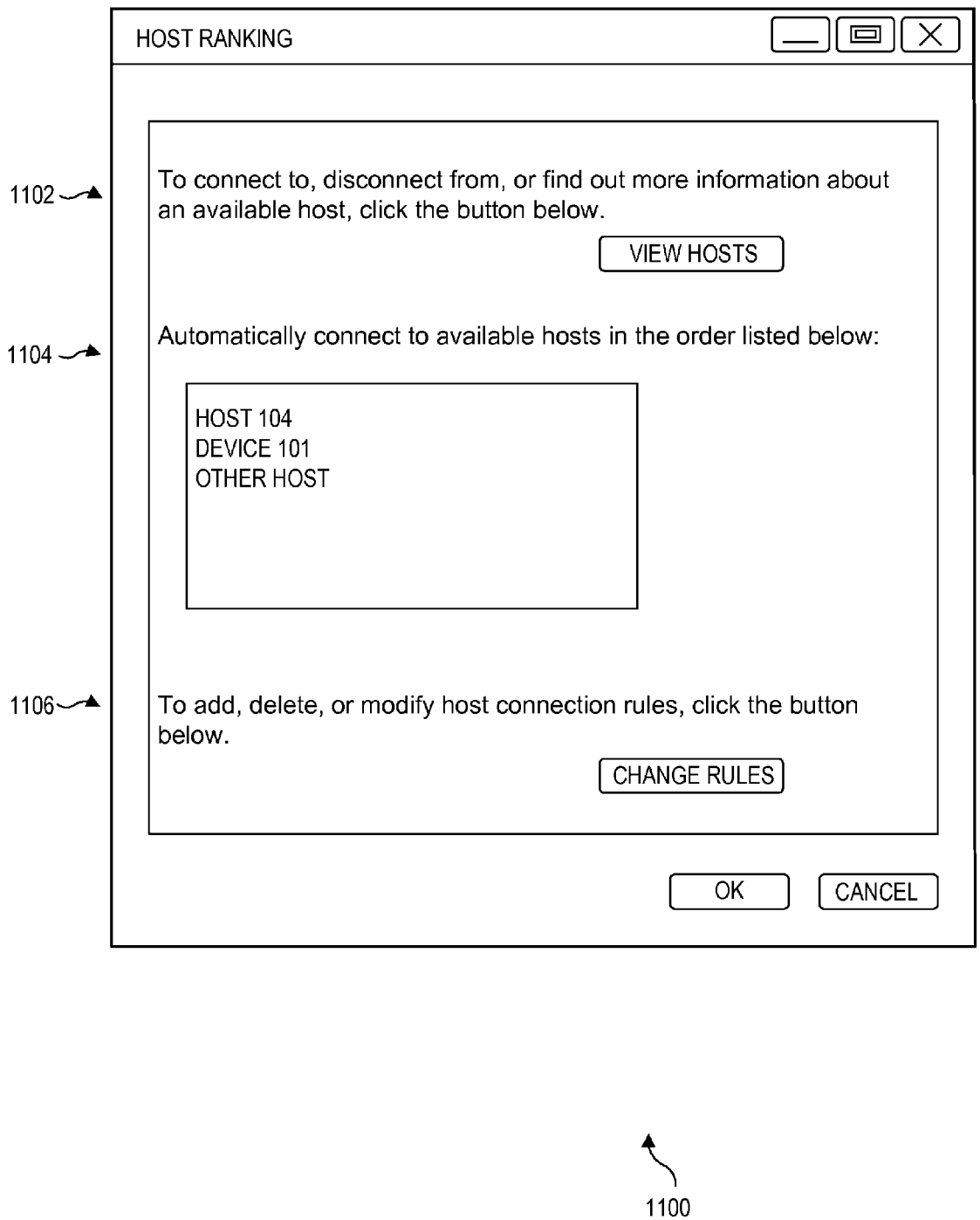
FIG. 11 is a host ranking user interface in accordance with an embodiment of the invention.

FIG. 11 shows an embodiment of a host ranking user interface (UI) 1100. In one embodiment, UI 1100 may be displayed at host 104 for ranking hosts for a connected device. Host 104 may download the host rankings and connection rules to the device. In another embodiment, UI 1100 may be displayed at device 102.

UI 1100 may show hosts available to the device (shown at 1102). A host may be available because the host is within wireless range of the device, the host is set as available to devices requesting to connect, and the like. UI 1100 may also be used to rank the order in which the device connects to available hosts (shown at 1104). The user may rank the hosts that the device has been associated with as desired. In one embodiment, a device may ship from a manufacturer with a default host ranking that may be modified by the user (e.g., default rule to connect to the first host the device sees).

The user may also add, delete, or modify host connection rules (shown at 1106). Host connection rules may be part of the host ranking and further dictate which hosts a device connects to in a multi-host environment. The connection rules may dictate switching between multiple hosts when an event occurs. Connection rules may be applied to one or more hosts in any kind of grouping. For example, the user may dictate that a particular rule applies to their mobile phone, but not to their laptop and desktop.

Example connection rules are as follows. The device may connect to the last host connected to if that host is available. The device may request connection to the first host the device sees. The device may connect to the host with the strongest signal.

The connection rules may also be based on the detection of an event. For example, a user may have a wireless headset (device) that has been associated with the user's mobile phone (host) and the user's laptop computer (host). The mobile phone and the laptop are both within range of the wireless headset. The user may be using the wireless headset to conduct a Voice over Internet Protocol (VoIP) call using the laptop. However, when a call is received at the user's mobile phone, the wireless headset automatically ends the laptop connection and connects to the mobile phone to connect to the mobile phone. In an alternative embodiment, when the call arrives at the mobile phone, an alert, such as a sound, window opening, etc., requests whether the user wishes to switch the wireless headset from the laptop to the mobile phone.

In another example of host connection rules, a user may have their media player (device) associated with a home media center (host) and a home PC (host). The user may connect the media player to the home media center to play music in the home and connect the media player to the home PC to synch music on the home PC with the media player.

The host connection rules determine whether the media player is to connect to the home media center or to the home PC based on which button on the media player is activated. For example, if the "play" button on the media player is pushed, then the media player connects to the home media center to play media stored on the media player over the home media center. If the "synch" button on the media player is pushed, then the media player connects to the home PC to synch media files on the media player with the home PC.

In another example, an event driven connection rule is based on detection of power up on a device. Upon power up, the device sees multiple hosts (e.g., a laptop and a desktop in the same cubicle). The device has previously been associated with the laptop. Signal strength is the same for both hosts. Also assume the device has not been associated with the desktop before, so the desktop would not already be listed in the host ranking on the device. In this example, one of the device's connection rules is to make any host advertising that it's accepting new connections that the device has not been previously associated with (i.e., the desktop) the top item in the host ranking.

Embodiments of the invention provide proxy association for devices. A host system may impersonate a device for associating a host-capable device with the impersonated device. The device may then directly connect to the host-capable device. Embodiments of the invention also include host rankings for determining which available host a device is to connect to in a multiple host environment.

Figure 12:
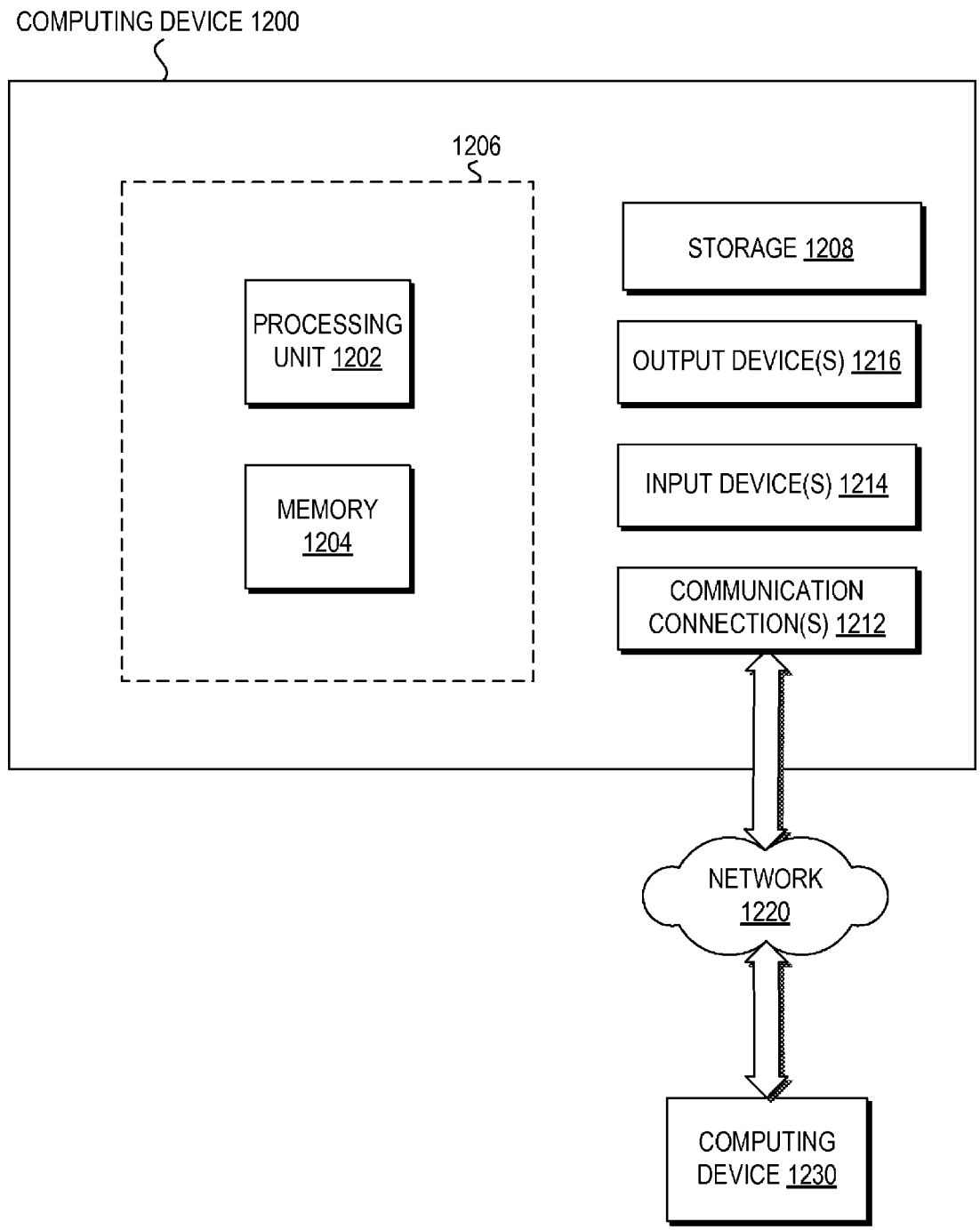
FIG. 12 is a block diagram of an example computing device for implementing embodiments of the invention.

FIG. 12 shows an example of a computing device 1200 for implementing one or more embodiments of the invention. Computing device 1200 may include, but is not limited to, a personal computer, server computer, notebook computer, mobile device (such as a mobile phone, Personal Digital Assistant (PDA), media player, and the like), multiprocessor system, consumer electronics device, mini computer, mainframe computer, and the like. In one configuration, computing device 1200 includes at least one processing unit 1202 and memory 1204. Depending on the exact configuration and type of computing device, memory 1204 may be volatile (such as RAM), non-volatile (such as ROM, flash memory, etc.) or some combination of the two. This configuration is illustrated in FIG. 12 by dashed line 1206. In one embodiment, processing unit 1202 executes computer readable instructions stored in memory 1204.

In other embodiments, device 1200 may include additional features and/or functionality. For example, device 1200 may also include additional storage (e.g., removable and/or non-removable) including, but not limited to, magnetic or optical disks or tape. Such additional storage is illustrated in FIG. 12 by storage 1208. In one embodiment, computer readable instructions to implement embodiments of the invention may be stored in storage 1208. Storage 1208 may also store other computer readable instructions to implement an operating system, an application program, and the like.

The term "computer readable media" as used herein includes computer storage media. Computer storage media includes volatile and nonvolatile, removable and non-removable media implemented in any method or technology for storage of information such as computer readable instructions or other data. Memory 1204 and storage 1208 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 1200. Any such computer storage media may be part of device 1200.

Device 1200 may also include communication connection(s) 1212 that allow device 1200 to communicate with other devices, such as computing device 1230, through network 1220. Communication connection(s) 1212 may include a wired interface or a wireless interface. Communication connection(s) 1212 may include, but is not limited to, a modem, a Network Interface Card (NIC), an integrated network interface, a radio frequency transmitter/receiver, an infrared port, Wireless USB, wired USB, firewire (IEEE 1394), Bluetooth®, or other interfaces for connecting computing device 1200 to other computing devices. Communication connection(s) 1212 may transmit and/or receive communication media.

The term "computer readable media" may include communication media. Communication media typically embodies computer readable instructions or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media.

Device 1200 may include input device(s) 1214 such as keyboard, mouse, pen, voice input device, touch input device, infra-red cameras, video input devices, and/or any other input device. Output device(s) 1216 such as one or more displays, speakers, printers, and/or any other output device may also be included in device 1200.

Components of computing device 1200 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. Input devices 1214 and output devices 1216 may be connected to device 1200 via a wired connection, wireless connection, or any combination thereof.

Those skilled in the art will realize that storage devices utilized to store computer readable instructions may be distributed across a network. For example, a computing device 1230 accessible via network 1220 may store computer readable instructions to implement one or more embodiments of the invention. Computing device 1200 may access computing device 1230 and download a part or all of the computer readable instructions for execution. Alternatively, computing device 1200 may download pieces of the computer readable instructions, as needed, or some instructions may be executed at computing device 1200 and some at computing device 1230. Those skilled in the art will also realize that all or a portion of the computer readable instructions may be carried out by a dedicated circuit, such as a Digital Signal Processor (DSP), programmable logic array, and the like.

Various operations of embodiments of the present invention are described herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment of the invention.

The above description of embodiments of the invention, including what is described in the Abstract, is not intended to be exhaustive or to limit the embodiments to the precise forms disclosed. While specific embodiments and examples of the invention are described herein for illustrative purposes, various equivalent modifications are possible, as those skilled in the relevant art will recognize in light of the above detailed description. The terms used in the following claims should not be construed to limit the invention to the specific embodiments disclosed in the specification. Rather, the following claims are to be construed in accordance with established doctrines of claim interpretation.

What is claimed is:

1. A method, comprising:
    establishing a first connection between a first device and a host, wherein the first device is host-capable;
    establishing a second connection between a second device and the host;
    performing a proxy association between the first device and the second device by the host to associate the first and second devices, wherein the first and second devices are unable to directly associate, wherein the host passes association information between the first and second devices;
    detecting an event by the second device;
    configuring a host ranking for the second device from the host, wherein the host ranking to enable the second device to determine which host to connect to when multiple hosts are available for connection to the second device; and
    downloading the host ranking from the host to the second device.

2. The method of claim 1, further comprising:
    disconnecting the first device from the host;
    disconnecting the second device from the host; and
    connecting the first device to the second device, wherein the first device is in a host mode.

3. The method of claim 1, further comprising:
    removing association information stored on the host after performing the proxy association.

4. The method of claim 1 wherein the first device having a first association with the host, and wherein the second device having a second association with the host.

5. The method of claim 4 wherein performing proxy association includes:
    gathering information from the second device by the host to enable the host to impersonate the second device;
    establishing a third association between the first device and the host impersonating the second device; and
    sending association information related to the third association from the host to the second device, wherein the association information related to the third association to enable the second device to connect to the first device.

6. The method of claim 1 wherein performing proxy association includes:
    impersonating the second device by the host when the host connects to the first device;
    obtaining the association information from the first device by the host impersonating the second device; and
    sending the association information from the host to the second device, wherein the association information to enable the second device to connect to the first device.

7. The method of claim 1 wherein the first and second devices share a same association model, but are unable to directly associate.

8. The method of claim 1 wherein performing the proxy association between the first device and the second device establishes associations for two or more connection technologies at the first and second devices.

9. The method of claim 1, further comprising:
    connecting to one of the host and the first device, wherein the first device is operating in host mode, based at least in part on the host ranking stored on the second device when the host and the first device, operating in host mode, are available for connection to the second device.

10. One or more computer readable storage media including computer readable instructions that, when executed, perform the method of claim 1.

11. A method, comprising:
    detecting an event by a device, wherein the device has been associated with two or more hosts, wherein the event is an indication that the two or more hosts become available to the device;
    determining which host of the two or more hosts are available to the device;
    determining which host of the two or more hosts that are available to the device to connect to based at least in part on the event and a host ranking stored on the device; and
    configuring the host ranking on the device.

12. The method of claim 11, wherein a host already connected to the device is disconnected from the device to connect to another host in response to the event.

13. The method of claim 11, wherein configuring the host ranking includes:
    configuring the host ranking for the device from a host connected to the device; and
    downloading the host ranking from the host to the device.

14. The method of claim 11, further comprising:
    performing proxy association to associate the device with at least one of the two or more hosts.

15. One or more computer readable storage media including computer readable instructions that, when executed, perform the method of claim 11.

16. A system, comprising:
    a first device having a first connection with a host, wherein the first device is host-capable;
    a second device having a second connection with the host, wherein the first and second devices are unable to directly associate,
    wherein the host is configured to perform a proxy association between the first device and the second device to associate the first and second devices, wherein the host passes association information between the first and second devices;
    the second device detects an event;
    the second device configures a host ranking from the host, wherein the host ranking to enable the second device to determine which host to connect to when multiple hosts are available for connection to the second device; and
    the second device downloads the host ranking from the host.

17. The system of claim 16 wherein the first device having a first association with the host, wherein the second device having a second association with the host, and wherein performing the proxy association includes:
    gathering information from the second device by the host to enable the host to impersonate the second device;
    establishing a third association between the first device and the host impersonating the second device; and
    sending association information related to the third association from the host to the second device, wherein the association information related to the third association to enable the second device to connect to the first device.

18. The system of claim 16 wherein performing the proxy association includes:
    impersonating the second device by the host when the host connects to the first device;
    obtaining the association information from the first device by the host impersonating the second device; and
    sending the association information from the host to the second device, wherein the association information to enable the second device to connect to the first device.

* * * * *